UNITED STATES PATENT OFFICE.

JULIUS R. POND, OF NEW HARTFORD, CONNECTICUT.

IMPROVEMENT IN CONDENSING MILK.

Specification forming part of Letters Patent No. 51,749, dated December 26, 1865.

*To all whom it may concern:*

Be it known that I, JULIUS R. POND, of New Hartford, in the county of Litchfield and State of Connecticut, have invented a certain new and useful Improvement in Condensing Milk; and I do hereby declare that the following is a full, clear, and exact description of the same.

No drawings accompany this specification, for the reason that my improvement is a new process of working, and is not an invention of any form of apparatus, and does not depend upon any particular apparatus, for it can be carried out by the vessels and machinery already in familiar use in milk-condensing establishments.

Mr. Gail Borden patented several years since a process of condensing milk, in which the milk to be condensed is, before it is run into the vacuum-pan, heated sufficiently to coagulate the chief portion of the albuminous constituents of it. The object of this preliminary coagulation is to prevent the coating of the inner surface of the pan by this albumen, which coating, inasmuch as albumen is coagulable by heat, would otherwise take place during the boiling in the pan, and if it did occur would entirely prevent the condensing of the charge, for the reason that the albuminous coating is a powerful non-conductor, and does not permit heat to penetrate through it to any practical extent; but although this process of Mr. Borden is and long has been in highly successful use, it is open to the objection that the heat necessarily applied to the milk in order to coagulate the albumen before running the charge into the pan is liable to burn or "cook" the milk, and to impart to it a taste which many consumers find unpleasant.

On the 5th of January, 1864, I obtained Letters Patent of the United States for a process of condensing milk, the chief element in which is the treating of the interior surface of the pan with an oily material in such a manner as to produce upon such surface a thin film of oil or grease before the milk to be condensed is run into the pan. By this means I am able to entirely dispense with any preliminary coagulation of the albumen of the milk, as no coating of the pan will take place during the condensing process when the pan is thus oiled. The same process is also described in a patent for a further improvement in condensing milk, issued to me November 14, 1865. This method of procedure I have found to be entirely successful; but if a charge of condensed milk is removed from the pan when it has been reduced "four to one," as it is technically called in the business—that is, when four quarts of crude milk have been evaporated to one quart of condensed milk, which is the usual consistency adopted in practice—the product will be too thin to suit the taste of many consumers; and although it might be made thicker by evaporating and condensing it still more, the cost of the product would then be largely increased, because considerably more crude milk would then be required to furnish a given quantity of condensed milk.

It is found in practice that the best point at which to stop the evaporation in the pan is, as stated, when the charge has been reduced about four to one, because this gives a good consistency in the product at the same time that it secures a proper economy of the crude milk. In order, therefore, to impart to the milk thus condensed the thickness or body requisite to suit the taste of many purchasers, my present improvement consists in breaking the vacuum in the pan and checking the evaporation shortly before the charge has been condensed four to one, or thereabout, and then, without removing the milk, raising the heat in the pan, or "superheating," as it may be termed, which will produce the proper thickening of the already condensed charge. I usually carry this superheating up to about 130° Fahrenheit, and from that point up to about 150° or 160°, according to the thickening which I wish to produce. This is the range which I prefer; but it is obvious that it may be carried still higher, if desired, and also that it may run somewhat lower than 130°; but I find that the most beneficial effect will be produced by following the range I have indicated.

The length of time during which the superheating is to be continued will vary under different circumstances, according to the degree of heat employed and the extent of the thickening required. I usually prefer to continue it for from about five to twenty minutes, and when so working have attained excellent results; but a little practice will best indicate the proper time, though I may say that the lower the heat employed the longer should the superheating be kept up.

In this way I am able to secure all the benefits of the process patented by me January 5, 1864, in relation to entirely avoiding the burned or cooked taste in condensed milk, while at the same time I can furnish the condensed product of a proper thickness and body to suit the wants of differing markets.

My process can, if desired, be employed in condensing milk in an open pan; but it will produce the best results when applied in connection with a vacuum-pan in the usual way.

I wish it to be understood that I do not claim broadly the superheating of milk, nor broadly the superheating of condensed milk; and I am well aware that Mr. Borden, to whom I have already referred, has practiced the superheating of the contents of the pan after the albumen of the crude milk has first been coagulated in the manner mentioned. My present improved process is entirely distinguishable from this, for the reason that I superheat a material which has been run into the vacuum-pan in a cold state and wholly uncoagulated, and which would coat the pan in such a manner as to prevent the condensation of the charge were it not for the application to the inner surface of the pan of some oleaginous article, as set forth in my patents of January 5, 1864, and November 14, 1865, already referred to. Mr. Borden, on the contrary, only uses the superheating in connection with his process of heating the crude milk and coagulating the albumen in it before it is put into the pan at all.

What I therefore claim as new, and desire to secure by Letters Patent, is—

The above-described process of condensing milk, consisting in combining the superheating, in the manner substantially as set forth, with the evaporation in the pan of crude milk, which has been run into the pan in a cold and uncoagulated state, substantially as described.

JULIUS R. POND.

Witnesses:
S. D. COZZENS,
JAS. BUTLER.